Aug. 28, 1934.  G. A. SCHIEREN  1,971,697
METHOD OF CEMENTING BELTS
Filed April 17, 1933
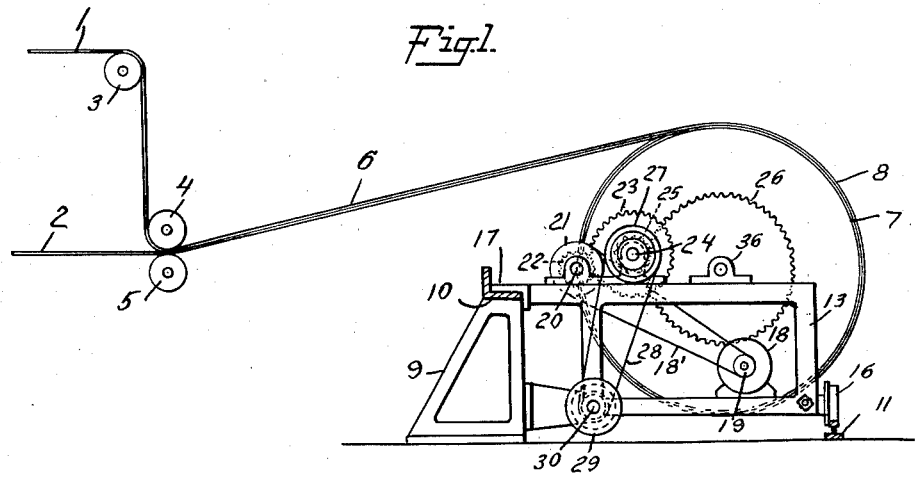
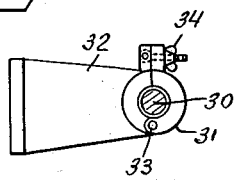
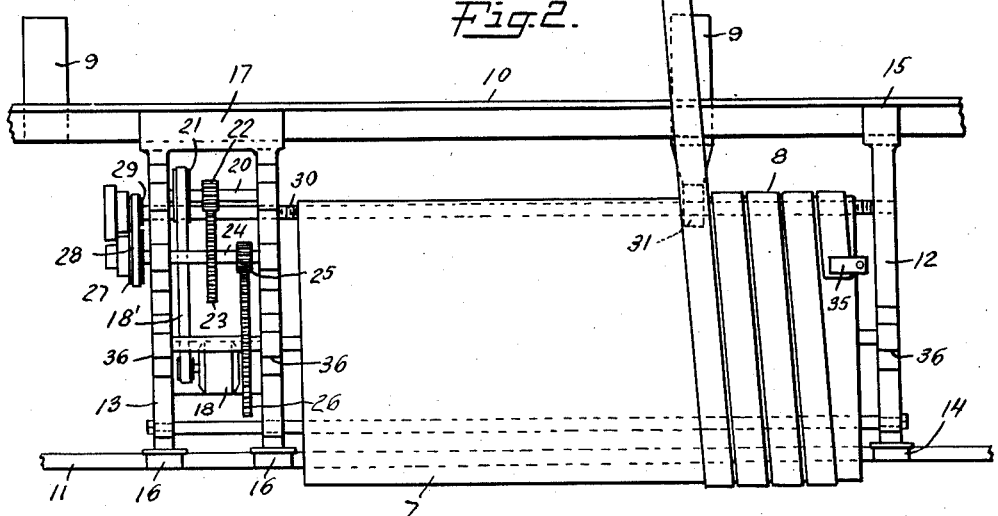
INVENTOR
G. Arthur Schieren
BY
Pennie, Davis, Marvin & Edmonds
ATTORNEYS Patented Aug. 28, 1934

1,971,697

UNITED STATES PATENT OFFICE 1,971,697

METHOD OF CEMENTING BELTS

George Arthur Schieren, Great Neck, N. Y.

Application April 17, 1933, Serial No. 666,441

4 Claims. (Cl. 154—4)

This invention relates to the manufacture of flat belting and more particularly to a method and apparatus for cementing multi-ply flat belts.

In the usual method of making flat belts of two or more plies of material, the plies are passed between pressure rolls with a suitable adhesive on their contacting faces to cement them to each other. The cemented layers are then wound on a suitable drum, preferably under tension, and the belting material is allowed to remain on the drum until the adhesive is thoroughly dried. This method is open to the objection that the belting material is wound upon itself on the drum and any unevenness of the material is transmitted to adjacent layers.

According to the method of my invention I apply equal pressure to the belting material by winding it spirally on a drum so that a single thickness of belting material is arranged on the drum. In this manner I obtain better adhesion between the plies. The drum is preferably provided with a rubber surface and each layer of the belt is always in pressure contact with this cushioning surface. If the belting material is of uneven thickness at any point, which frequently occurs, there is no transmission of uneven pressures to other portions of the belt due to this uneven thickness.

In carrying out the invention I provide suitable apparatus whereby the plies are cemented to each other and then they are wound upon a drum which revolves, and at the same time, travels substantially at right angles to the line of travel of the belting material at a predetermined speed whereby the adjacent windings of the belt on the drum are arranged beside each other in a spiral form. When the drum surface is covered with a belting material it may be readily removed from the machine and an empty drum substituted therefor.

In the accompanying drawing I have diagrammatically illustrated suitable apparatus for carrying out the invention. In the drawing:

Fig. 1 is a side elevation;

Fig. 2 is a plan view; and

Fig. 3 is a detailed, sectional view of the feeding mechanism for the drum.

Referring to the drawing, the reference numerals 1 and 2 designate plies of belting material. The invention may be applied to any of the usual belting materials, such as leather, textile fabrics and the like. These plies are passed over suitable guide rolls, one of which is illustrated at 3. A pair of pressure rolls 4 and 5 are arranged in the path of the belting material and the two plies of belting material are passed through these pressure rolls as shown. The pressure rolls may be provided with suitable braking mechanism (not shown) or other conventional means for applying tension to the belting material. Likewise, any suitable adhesive or cementing material may be applied to one or both of the contacting faces of the belting material before reaching the pressure rolls by any conventional means (not shown).

The cemented belting material 6 passes from the pressure rolls to a drum 7. In accordance with the usual practice the belting material is wound upon the drum under tension and is permitted to remain on the drum until the adhesive is thoroughly dried and the plies of the belting material are cemented to each other. As stated above, I provide mechanism whereby the drum may travel at right angles to the direction of travel of the belting material in order to wind the belting material on the drum in the form of a spiral, as indicated at 8 in Fig. 2 of the drawing. In front of the drum I provide a suitable stationary support 9 having a track 10 to support a portion of the frame of the drum and permit movement of the frame. A track 11 is arranged at the rear of the drum parallel to the track 10 and spaced a suitable distance therefrom.

The drum is mounted in a suitable frame consisting of end sections 12 and 13. The end section 12 at one end of the drum carries a roller 14 adapted to run upon the track 12 and also carries a flattened extension 15 adapted to rest upon and ride on the flat surface or track 10 of the frame 9. The end frame 13 at the other end of the drum is generally similar to the frame 12 but consists of two spaced sections to support a drive motor and suitable gearing. As shown, this frame is provided with rollers 16 adapted to ride on the track 11 and the two sections thereof are connected by a flattened extension 17 adapted to ride on the flat surface or track 10. A drive motor 18 is mounted in the frame 13 and a belt 18' passes over a pulley 19 on the motor shaft. This belt drives a shaft 20 by means of a pulley 21. The shaft 20 is provided with a pinion 22 meshing with a gear 23 mounted on a main drive shaft 24. The shaft 24 is provided with a pinion 25 driving a gear 26 on the main shaft of the drum. The shaft 24 is further provided with a pulley 27 adapted to receive a belt 28 and this belt passes over pulley 29 mounted on a screw feed shaft 30. The pulleys 27 and 29 may be cone pulleys of the conventional type whereby the speed of travel of the feed shaft and thus the speed of travel of the drum can be regulated.

The feed shaft 30 passes through a split nut 31 (see Fig. 3) carried by an arm or bracket 32 mounted on the stationary frame 9. The nut 30 is made of two sections pivotally connected at 33 and adapted to be retained in operative position by suitable locking mechanism 34. Only the outer pivoted section of the nut is threaded so that when the sections are opened, the feed shaft 30 is out of engagement with the threads of the nut and the movable drum frame may then be manually moved to its original position.

In practicing the method of my invention, the belting material is cemented together by the pressure rolls 4 and 5 and fed to the drum as indicated at 6. The drum is of sufficient size to hold standard lengths of leather belting which are approximately 300 to 350 feet. It revolves very slowly making about 1 or 2 revolutions per minute. At the same time it travels along its axis at a definite rate of speed which can be controlled by regulating the feed of the screw shaft 30 by means of the cone pulleys 27 and 29. The end of the belting material is secured on the drum by a suitable clamp 35 and the material is wound on the drum under tension with each layer of the belting material in contact with the surface of the drum. As stated above, the surface of the drum is preferably formed of rubber, the rubber surfacing being generally about one inch thick.

When the length of belting has been applied to the surface of the drum in the manner indicated, the drum may be removed from the frame. As shown, the drum is mounted in bearings 36 in the end frames 12 and 13 and these bearings can be so constructed that the drum may be lifted out of the frame and replaced by an empty drum. Before starting to wind another length of belting on the empty drum the locking member 34 of the feed nut is released and the drum frame moved manually to its starting position. Suitable means (not shown) may also be provided for adjusting the drum at a varying angle with the stationary table or frame 9 in order to compensate for the spiral winding of the belting material. This angle may be regulated and varied according to the width of the belting material. Likewise, the speed of the screw shaft 30 may be regulated to feed the drum at varying rates of speed proportionate to the varying width of belting material so that the belting material will be properly wound upon the drum without the adjacent convolutions overlapping each other.

I claim:

1. In the manufacture of flat belting material, the process which comprises applying cementing material to the adjacent surfaces of plies of belting material to cement the plies to each other, then winding the belting material on a drum with each convolution of the belting material in engagement with the surface of the drum, and permitting the belting material to remain on the drum until the cementing material is dry.

2. In the manufacture of flat belting material, the process which comprises cementing layers of belting material to each other, and maintaining substantially all of the belting material under compressive tension during the drying of the cementing material with each portion of the belting material out of contact with other portions thereof.

3. In the manufacture of flat belting material, the process which comprises applying cementing material to the adjacent surfaces of plies of belting material to cement the plies to each other, then winding the belting material on a drum in spiral form, and permitting the belting material to remain on the drum until the cementing material is dry.

4. In the manufacture of flat belting material, the process which comprises applying cementing material to the adjacent surfaces of plies of belting material to cement the plies to each other, then winding the belting material on a drum and simultaneously moving the drum axially to dispose the belting material on the drum surface in spiral form, and permitting the belting material to remain on the drum until the cementing material is dry.

GEORGE ARTHUR SCHIEREN.